United States Patent
Bertola et al.

(10) Patent No.: US 6,979,752 B1
(45) Date of Patent: Dec. 27, 2005

(54) CONTINUOUS PROCESS FOR CONVERTING POLYTETRAMETHYLENE ETHER DIESTER TO POLYTETRAMETHYLENE ETHER GLYCOL

(75) Inventors: Aldo Bertola, Milan (IT); Salvatore Cassarino, Rome (IT); Myriam Hobe, Bas-Oha (BE)

(73) Assignee: BASF Aktiengesellschaft, Ludwigshafen (DE)

( * ) Notice: Subject to any disclaimer, the term of this patent is extended or adjusted under 35 U.S.C. 154(b) by 297 days.

(21) Appl. No.: 10/111,474

(22) PCT Filed: Oct. 25, 2000

(86) PCT No.: PCT/EP00/10511

§ 371 (c)(1),
(2), (4) Date: Feb. 10, 2003

(87) PCT Pub. No.: WO01/30885

PCT Pub. Date: May 3, 2001

(Under 37 CFR 1.47)

(30) Foreign Application Priority Data

Oct. 27, 1999 (BE) .............................. 9900701

(51) Int. Cl.⁷ ............................ C07C 43/11; C08F 2/00; C08K 3/32
(52) U.S. Cl. ............................ 568/617; 526/65; 526/66; 526/67; 526/68; 526/69; 526/71; 524/706; 524/710; 524/711; 524/779
(58) Field of Search .............................. 526/65, 66, 67, 526/68, 69, 71; 524/706, 710, 711, 779; 568/591, 602, 617, 618

(56) References Cited

U.S. PATENT DOCUMENTS

| | | | |
|---|---|---|---|
| 4,230,892 A | 10/1980 | Pruckmayr | |
| 4,460,796 A | 7/1984 | Mueller | |
| 5,981,688 A | 11/1999 | Auer | |

FOREIGN PATENT DOCUMENTS

| | | |
|---|---|---|
| DE | 198 17113 | 10/1999 |
| WO | 97/23559 | 7/1997 |

OTHER PUBLICATIONS

Data base XP–002162053.

*Primary Examiner*—Samuel A. Acquah
(74) *Attorney, Agent, or Firm*—Oblon, Spivak, McClelland, Maier & Neustadt, P.C.

(57) ABSTRACT

A continuous process for converting by transesterification the diester of polytetramethylene ether (PTMEA) to the corresponding polytetramethylene ether glycol (PTMEG). The process is characterized by the fact that the feed, consisting of PTMEA along with an alkanol (preferably methanol) and with an alkali metal oxide, hydroxide or alkoxide catalyst (preferably sodium methaoxide) is made to react in two multistaged reactions in series. In the first reactant, including stages of retention in association with distillation trays of high efficiency, the bulk of conversion is achieved by stripping the alkanol ester formed in the transesterification with vapors of hot alkanol having a reduced content of alkanol ester. The transesterification is completed in the second reaction by stripping the effluent from the first reactor with vapors of hot alkanol almost free of alkanol ester. The PTMEG product is finally purified by neutralizing the alkaline catalyst with a mixture of phosphoric acid and sodium phosphate monobasic.

10 Claims, 1 Drawing Sheet

Figure 1:
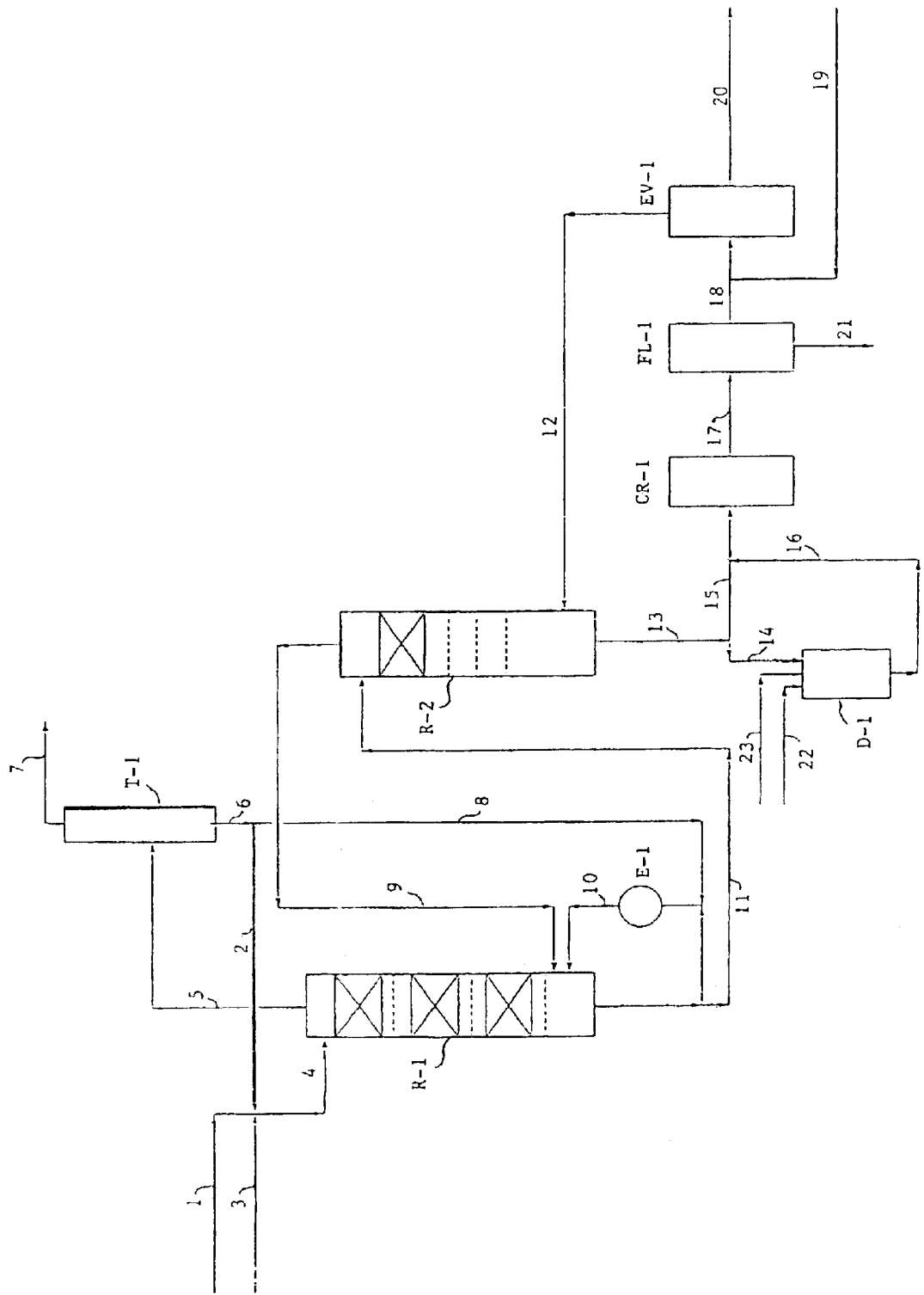

CONTINUOUS PROCESS FOR CONVERTING POLYTETRAMETHYLENE ETHER DIESTER TO POLYTETRAMETHYLENE ETHER GLYCOL

BACKGROUND OF THE INVENTION

Poly(tetramethylene ether) glycol (PTMEG) is produced by polymerizing tetrahydrofuran (THF) in presence of an anhydride, typically acetic anhydride (ACAN), to form the diacetate of the polymerized tetrahydrofuran (PTMEA), which must be converted to the corresponding dihydroxy product (PTMEG).

As extensively described in the technical literature, the acetate end groups are removed by submitting PTMEA to transesterification with an alcohol, usually methanol, in presence of an alkaline catalyst. After the transesterification is complete, the alkaline catalyst is removed by reacting the catalyst with an acid forming a salt which is removed by filtration. The technology of transesterification is well known and described in the technical literature, as for instance in U.S. Pat. No. 2,499,725, Journal of Americal Society Vol. 70 pg. 1842, and in Groggings "Unit processes in organic synthesis" pg. 710–715.

Since the presence of PTMEA in the PTMEG product, even in small amount, is not desirable in urethane applications, high level of conversion, typically above 99,9%, is to be achieved in the transesterification. Another critical factor affecting the quality of the product is the presence of alkalinity or of acidity in the product.

The operation in batch of the transesterification and of the neutralization permits a positive control of the performances in order to assure the production of PTMEG meeting the critical standards of quality.

The operation in batch, however, requires high and discontinuous consumptions of steam, bigger equipment, increased manpower.

A continuous mode of operation is by all means desirable, but, compared to the batch mode, has a lower degree of flexibility and consequently has a higher risk of yielding off spec PTMEG.

Consequently in the design of a continuous transesterification system special provisions have to be taken to assure high level of performances within the wide range of operating conditions encountered in the practice of industrial plants.

Such special provisions do not appear enough defined in the previous art.

In WO 97/23559 DU PONT describes a process of reactive distillation where the feed to the alkanolysis, consisting of PTMEA, an alkanol and an alkaline catalyst is fed to the top section of a distillation column while hot vapors of alkanol are fed to the bottom of the column to sweep any alkanol ester formed by alkanolysis of PTMEA.

In the above mentioned patent DU PONT states that the processes described in his previous U.S. Pat. No. 4,230,892 and U.S. Pat. No. 4,584,414 fall to assure such high level of performances are required in a process operating in a continuous mode of operation.

However, the statement in WO 97/23559 that the alcoholysis by reactive distillation may be performed by means of any of the distillation methods and equipment as generally known and practiced in the art, including conventional tray distillation columns, does not appears to provide by all means satisfactory results. In fact incomplete conversions have been achieved when performing alcoholysis in a conventional column with multiple trays, in case the global retention time of the liquid reagents in the column is fairly low, for instance less than half an hour.

As clearly described in Grogging "Unit processes in organic synthesis" chapt. 12, the correct design of a continuous multistage transesterification reactor requires the knowledge not only of the thermodynamics but also of the laws of mass action and of kinetics, which determine the speed of the reaction, the retention time necessary, and consequently the approach to equilibrium in each stage.

In case of inadequate retention time the reaction does not evolve to equilibrium, and the performances differ substantially from the values predictable by the conventional methods of distillation.

About the neutralization, the previous art does not offer fully satisfactory solutions in relation to a continuous mode of operation.

U.S. Pat. No. 4,460,796 describes a process where the alkaline catalyst is removed by reacting with orthophosphoric acid in the equivalence ratio of from 1.5 to 2.5:3. The salt formed is subsequently separated from PTMEG by filtration.

The process appears in principle adequate in case the neutralization is performed batchwise, but is not free of risks in a continuous mode of operation, where it may result not easy to control the addition of reagent acid within the specified range of equivalents, in consideration of the fluctuations which occur in the industrial practice.

In case of abnormal operation the PTMEG product will be contaminated either by an abnormal content of alkali or by an excess of acid.

DESCRIPTION OF THE INVENTION

It is object of this invention a transesterification process capable to produce, on a continuous mode of operation, PTMEG free of PMTEA, neutral and free of inorganic salts.

PTMEA will be ordinarily a polymer with diacetate end groups obtained by polymerizing THF in a medium containing ACAN.

The conversion of PTMEA to PTMEG is made by catalystic transesterification of PTMEA using a $C_1$ to $C_4$ alkanol, preferably methanol, as transesterifying agent and an alkali methal oxide, hydroxide or methoxide, preferably sodium methylate, as catalyst.

Typically the feed to the transesterification comprises PTMEA from 40 to 60% by wt., alkanol (i.e.; methanol) from 60 to 40% by wt, catalyst (i.e.: sodium methylate) from 500 to 1000 ppm based on PTMEA.

In the process of this invention the transesterification is performed in two reactors in series operating at nearly atmospheric pressure and at a temperature close to the boiling point of the alkanol, characterized by the following steps:

a) introducing the feed to the first stage of the first multistaged reactor.

The first reactor comprises a sequence of stages designed to provide adequate retention time followed by a high efficient distillation trays. The global retention time in the first reactor is from 1.0 to 4 hours, preferably about 2 hours.

b) recovering from the overheads of the first reactor vapors of alkanol and of the ester of alkanol formed in the transesterification;

c) delivering said vapors of alkanol and of alkanol esters to an azeotropic column to separate overheads the azeotrope of alkanol ester and at a bottoms alkanol with a low content of alkanol ester, to be recycled to the process;

d) feeding to the last stage of the first reactor vapors of the alkanol separated at the bottoms of said azeotropic column and vapors of methanol from the second reactor, to sweep the major part of the alkanol ester formed by transesterification in the first reactor;

e) feeding the liquid effluent from the last stage of the first reactor to the first stage of the second multistaged reactor.

The second reactor comprises a sequence of stages designed to assure adequate retention time, in combination with high efficient distillation trays. The global retention time in the second reactor is of from 0.5 to 3 hours, preferably about 1.0 hour.

f) recovering from the overheads of the second reactor vapors of alkanol with residual amount of alkanol ester to be transferred to the last stage of the first reactor.

g) feeding to the last stage of the second reactor vapors of fresh alkanol and vapors of alkanol recovery from the effluent from the transesterification in an evaporation following the neutralization step.

h) adding to the liquid effluent of the last stage of the second reactor a mixture of phosphoric acid and of sodium phosphate monobasic to neutralize the basic catalyst, where the phosphoric acid is in equivalent proportion to the basic catalyst of 3 to from 2.6 to 3.4, preferably of 3 to 3, and where the sodium phosphate monobasic is in equivalent proportion to the basic catalyst of 2 to from 1.0 to 4.0 preferably of 2 to 2.

i) feeding the neutralization effluent to a crystallizer.

j) feeding the crystallizer effluent to a filtration unit.

k) feeding the effluent from the filtration to an evaporator to remove vapors of alkanol which are fed to the last stage of the second reactor as per point g) above.

The embodiments of this invention are schematically represented in FIG. 1.

TMEA containing only traces of ACAN,* ACOH and of non converted THF is mixed (line 1) with a stream of recovered methanol with reduced methylacetate content (line 2) and with a stream of transesterification catalyst, preferably consisting of sodium methylate dissolved in methanol (line 3).

The mixture enters (line 4) the upper stage of the first reactor (R-1).

In the first reactor (R-1) PTMEA is made to react with methanol forming PTMEG and methylacetate. In order to favour the conversion the mixture flows in a sequence of stages comprising stages of retention followed by high efficient distillation trays.

Vapors of methanol from the second reactor (R-2) (line 9) and from the reboiler (E-1) (line 10) are fed at the bottoms of the reactor.

Said vapors remove the methylacetate formed in the reactor, yielding overhead vapors consisting of a mixture of methanol and methylacetate, which is conveyed (line 5) to an azeotropic column (T-1). The azeotropic column (T-1) separates overheads a methylacetate-methanol azeotrope, which is disposed for further reprocessing (line 7) and at bottoms a stream of methanol with reduced methylacetate content (line 6) which is recycled partly to the feed (line 2) and partly to the reboiler of the first reactor (line 8). A conversion of not less than 99% is achieved in the first reactor.

The conversion is further improved in the second reactor (R-2); where the effluent from the first reactor (line 11) is subjected to stripping with hot methanol vapors (line 12) almost free of methylacetate. In the second reactor (R-2) the conversion is driven to values of above 99.99%, which grants the quality of the PTMEG product.

The PTMEG solution from the second reactor (line 13), flow in part (line 14) to the neutralizer preparation vessel (D-1), where it is mixed with phosphoric acid (line 22) and sodium phosphate monobasic (line 23). In particular, the phosphoric acid is orthophosphoric acid and the sodium phosphate monobasic is either of the monohydrate or of the dihydrate form.

The neutralizer mixture (line 16) and the bulk of PTMEG solution (line 15) flow to a crystallizer (CR-1) where the salts formed in the neutralization are made to grow to a filtrable size.

The crystallizer effluent (line 17) flows through a filter (FL-1) which separates the salts (line 21). The filtered PTMEG solution (line 18) is mixed with fresh methanol (line 19), the latter at a rate equivalent to the amount of methanol reacted to form methylacetate or present as such in the overheads of the azeotropic column (T-1).

Said mixture flows to an evaporator (EV-1) where the bulk of methanol is vaporized and fed (line 12) to the second reactor (R-2).

The effluent from the evaporator (EV-1) is PTMEG containing some residual methanol which may be removed by vaporization under vacuum or by stripping with aid of an inert gas.

The advantages of the process object of this invention are:

1) The use in the reaction system of stages providing retention time followed by high efficient distillation trays assures the achievement of high conversion within the wide range of fluctuations of process variables, which may occur in a continuous made of operation.

2) The use of two multistaged reactors of which the first one using as stripping medium alkanol containing some alkanol ester and the second one vapors of alkanol almost free of alkanol ester, increases substantially the efficiency of the continuous operation.

3) The use of a tampon system consisting of a mixture of phosphoric acid and sodium phosphate monobasic assures an efficient removal of the alkaline catalyst with no risk of leaving residual acidity in the product.

In fact, being the monobasic salt of phosphoric acid, contrary to phosphoric acid, almost insoluble in methanol and in PTMEG, any excess of it fed to the neutralization is removed by filtration.

EXAMPLE 1

A 50% by weight solution in methanol of PTMEA with number average molecular weight of 1090 was prepared and fed to a transesterification apparatus similar to that shown in FIG. 1.

Sodium methylate was added to the solution at a rate of 800 ppm based on PTMEA.

The temperature of the reaction in each reactor was kept in the range from 65° C. to 70° C.

A residence time of about 2 hours was provided the first reactor, containing 3 stages of retention and 6 distillation trays. A residence time of about 1 hour was provided in the second reactor containing 2 stages of retention and 4 distillation trays.

The vapors of methanol and methylacetate leaving overheads the first reactor were processed into an azeotropic column with 30 theoretical trays recovering at bottoms a stream of methanol with about 100 ppm of methylacetate recycled in the process, and separating overheads a stream of methylacetate-methanol azeotrope.

Vapor of fresh methanol (equivalent to the amount of methylacetate-methanol azeotrope) and vapors of methanol from the final vaporizer of PTMEG were used as stripping medium at the second reactor.

A mixture of phosphoric acid and of sodium phosphate monobasic was added to the effluent of the second reactor in equivalent proportion to sodium methylate of respectively 3:3 and 2:2.

The resulting mixture was processed into a crystallizer having a retention time of about 2 hours.

following the crystallizer, the mass was filtered to remove the phosphate salts.

The bulk of the methanol contained in the filtered product was removed in an evaporator.

After 2 days of continuous operation about 100 Kg of PTMEG having number average molecular weight of 1000 was produced.

Infrared spectroscopic analysis of the PTMEG product showed that conversion was complete.

Furthermore the PTMEG product was characterized by an acid and base number of 0 mg of KOH per gr, and to be free from ash, sodium and phosphate ions.

What is claimed is:

1. A transesterification process for converting, on a continuous mode of operation, the diester of polytetramethylene ether (PTMEA) to the corresponding polytetramethylene ether glycol (PTMEG) using two reactors in series and characterized by the following steps:
   a) introducing the feed comprising PTMEA and an effective amount of $C_1$ to $C_4$ alkanol plus an alkali metal oxide, hydroxide or alkoxide catalyst to the first stage of the first multistaged reactor, said first reactor comprising a sequence of stages designed to provide adequate retention time followed by high efficient distillation trays;
   b) recovering from the overheads of the first reactor vapors of alkanols and of the ester of alkanol formed in the transesterification;
   c) delivering said vapors of alkanol and of alkanol esters to an azeotropic column to separate overheads the azeotrope of alkanol ester and at bottoms alkanol with a low content of alkanol ester, to be recycled to the process;
   d) feeding to the last stage of the first reactor vapors of the alkanol separated at the bottoms of said azeotropic column and vapors of methanol from the second reactor to sweep the major part of the alkanol ester formed by transesterification in the first reactor;
   e) feeding the liquid effluent from the last stage of the first reactor to the first stage of the second multistaged reactor, said second reactor comprising a sequence of stages designed to assure adequate retention time, in combination with high efficient distillation trays;
   f) recovering from the overheads of the second reactor vapors of alkanol with residual amount of alkanol ester to be transferred to the last stage of the first reactor;
   g) feeding to the last stage of the second reactor vapors of fresh alkanol and vapors of alkanol recovery from the effluent from the transesterification in an evaporation following the neutralization step;
   h) adding to the liquid effluent of the last stage of the second reactor a mixture of phosphoric acid and of sodium phosphate monobasic to neutralize the basic catalyst, where the phosphoric acid is in equivalent proportion to the basic catalyst of 3 to the 2.6 to 3.4, and where the sodium phosphate monobasic is in equivalent proportion to the basic catalyst of 2 to from 1.0 to 4.0;
   i) feeding the neutralization effluent to a crystallizer;
   j) feeding the crystallizer effluent to a filtration unit;
   k) feeding the effluent from the filtration to an evaporator to remove vapors of alkanol which are fed to the last stage of the second reactor as per point g) above said two reactors in series operating at nearly atmospheric pressure and at a temperature close to the boiling point of the alkanol.

2. The process of claim 1 wherein the global retention time in the first reactor is of from 1.0 to 4 hours.

3. The process of claim 1 where the global retention time in the second reactor is of from 0.5 to 3 hours.

4. The process of claim 1 where said alkanol is methanol.

5. The process of claim 1 where said catalyst is sodium methoxide.

6. The process of claim 1 where the phosphoric acid is orthophosphoric acid and the sodium phosphate monobasic is either of the monohydrate or of the dihydrate form.

7. The process of claim 1 wherein in step h), the phosphoric acid is in equivalent proportion to the basic catalyst of 3 to 3.

8. The process of claim 7 wherein in step h) the sodium phosphate monobasic is in equivalent proportion to the basic catalyst is 2 to 2.

9. The process of claim 2 wherein the global retention time is about 2 hours.

10. The process of claim 3 wherein global retention time is about 1.0 hour.

* * * * *